United States Patent
Henning et al.

[15] 3,643,931
[45] Feb. 22, 1972

[54] SPRAY SYSTEM FOR COOLING TOWERS

[72] Inventors: Herbert Henning, Langenberg; Werner Alt, Bochum; Paul Reiter, Hattingen, all of Germany

[73] Assignee: Maschinenbau-Aktiengesellschaft Balcke, Bochum, Germany

[22] Filed: Nov. 19, 1969

[21] Appl. No.: 878,014

[30] Foreign Application Priority Data

Nov. 19, 1968 Germany ............ P 18 09 605.4

[52] U.S. Cl. .................. 261/111, 261/112, 261/DIG. 11
[51] Int. Cl. ............................................. B01f 3/04
[58] Field of Search ............... 261/108–112, DIG. 11

[56] References Cited

UNITED STATES PATENTS

| | | | |
|---|---|---|---|
| 821,561 | 5/1906 | Wheeler et al. | 261/110 |
| 2,002,065 | 5/1935 | Kryszewski et al. | 261/109 |
| 2,239,936 | 4/1941 | Simons | 261/111 |
| 2,836,405 | 5/1958 | Hamon | 261/112 |
| 3,063,688 | 11/1962 | Fordyce et al. | 261/108 |
| 3,189,329 | 6/1965 | Smith et al. | 261/109 X |
| 3,346,246 | 10/1967 | Loetel et al. | 261/112 X |
| 3,468,521 | 9/1969 | Furlong et al. | 261/111 |

FOREIGN PATENTS OR APPLICATIONS

| | | | |
|---|---|---|---|
| 664,899 | 6/1963 | Canada | 261/DIG. 11 |
| 1,187,323 | 3/1959 | France | 261/108 |
| 781,160 | 8/1957 | Great Britain | 261/DIG. 11 |

Primary Examiner—Tim R. Miles
Attorney—Walter Becker

[57] ABSTRACT

A trickling assembly for cooling towers, according to which lattice means are supported by trickling plates while at least a portion of said lattice means extends to a level lower than that of said trickling plates, said portion carrying spray slats arranged in a vertically spaced relationship to each other.

6 Claims, 4 Drawing Figures

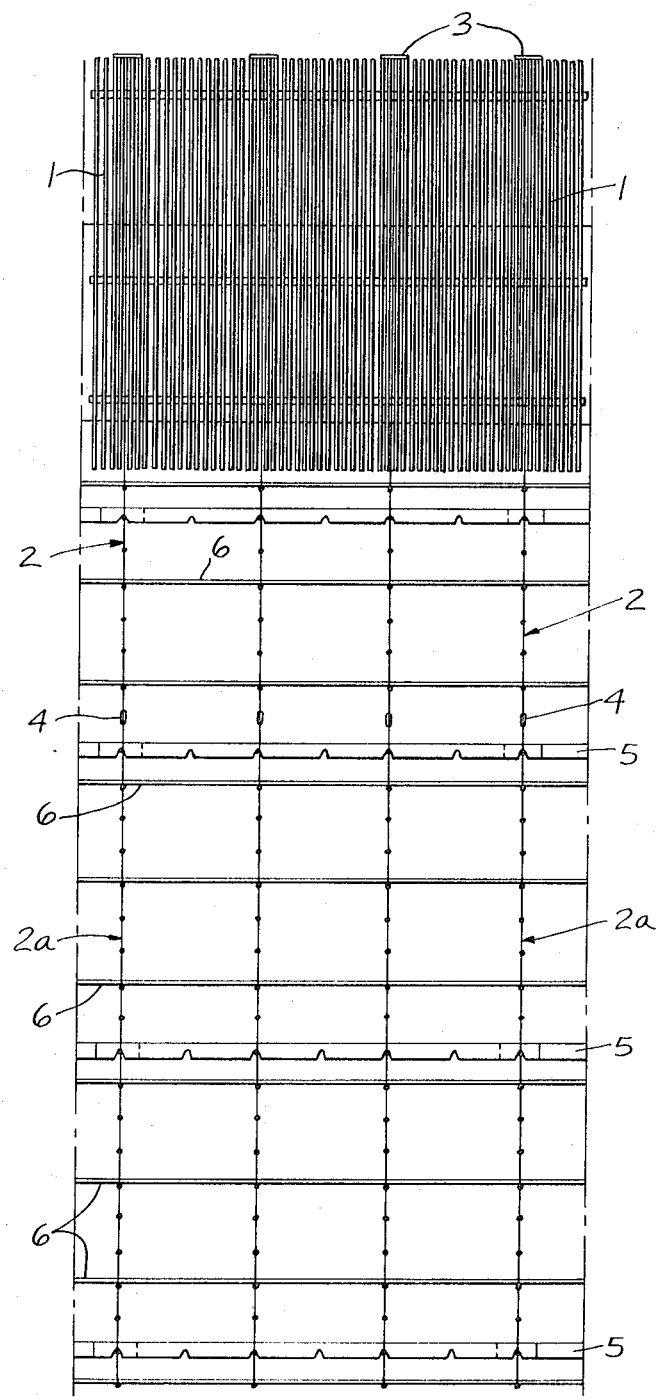

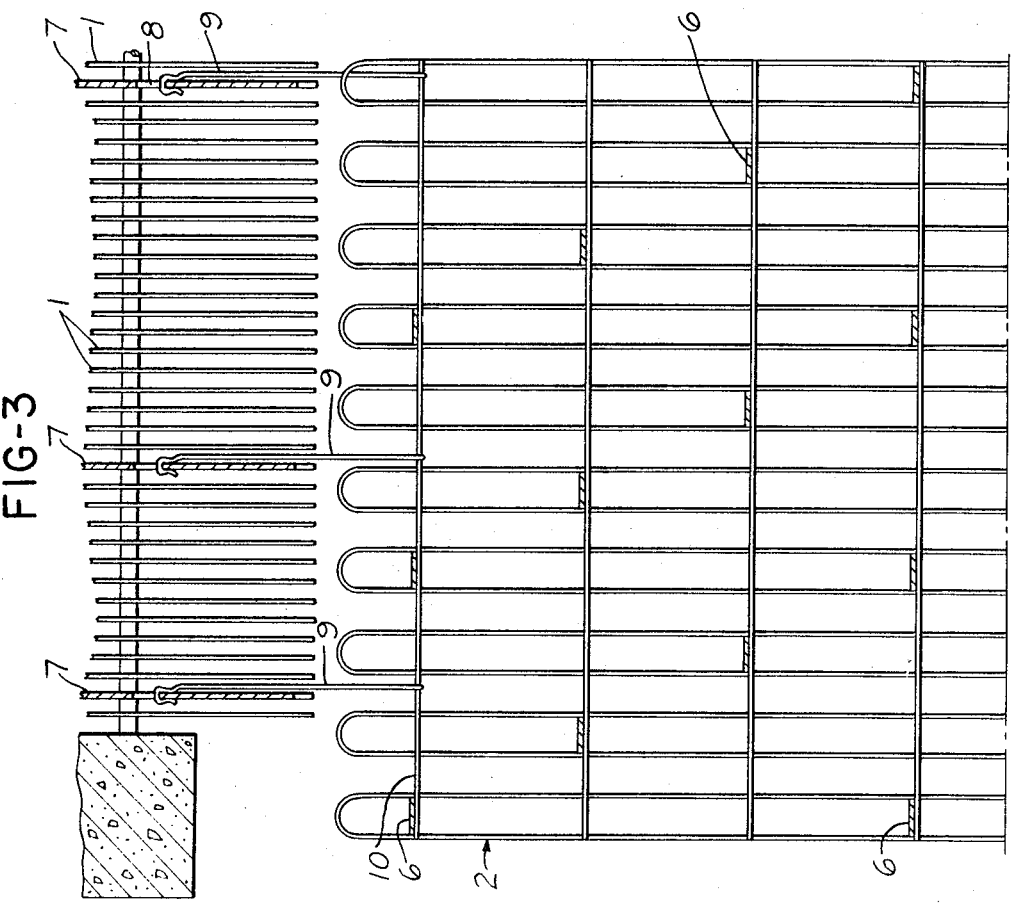

SPRAY SYSTEM FOR COOLING TOWERS

The present invention relates to a combined trickling and spraying system for cooling towers in which water running in downward direction is cooled by air flowing in a direction counter or transverse thereto. It is known to install so-called trickling plates into cooling towers of the above mentioned type which trickling plates rest on beams or girders and are suspended in the cooling tower in parallel arrangement to each other. On the plates, a water film forms which the exchange of heat and material takes place. Furthermore, also so-called spray plates have been installed in cooling towers. The downwardly running water hits these plates and is split up into fine droplets along the surface of which the heat and material exchange takes place. The installation of trickling plates and spray plates in the interior of cooling towers requires a considerable amount of elements and relatively high costs.

Thus, for instance, a device has become known for holding cantileverlike spray plates the ends of which rest on strips or ledges. These spray plates consist of upright supporting walls of which those lateral vertical surfaces which face each other are provided with vertical and horizontal grooves intersecting each other. Supporting strips or ledges are inserted into the horizontal grooves, whereas the ends of the trickling rods are inserted into the vertical grooves so that the ends rest upon the inserted supporting ledges.

A further problem consists in the replacement of the spray plates consisting in most instances of wood by slats of asbestos cement or synthetic material which in view of the properties of the material cannot be employed when the distance between the supports exceeds a certain free length and closer supports are required which for structural reasons cannot consist of walls or the like. It is known to employ lattice structures for supporting the spray plates which lattice structures consist preferably of synthetic material and have a mesh width which approximately corresponds to the width of the spray plates. This type of lattice work is suspended on latticelike supports at desired distances in the cooling tower, and the spray plates are place upon the horizontally extending webs. In this way, close supports for the spray plates can be produced in a structurally simple manner so that wood as well as asbestos cement and slats of synthetic material may be employed.

It is furthermore known in a cooler simultaneously to employ trickling plates and spray plates and to mount the spray plates directly below the trickling plates arranged in the upper section of the cooler. Thermal investigations have shown that the combination of trickling surfaces and spray plates results in a particularly good thermal effect which effect can by the mere use of trickling plates or spray plates be realized, if at all, only at considerably higher costs.

It is, therefore, an object of the present invention to provide a combined trickling system in which the spray plates can be mounted below the trickling plates in a particularly simple structural way.

This object and other objects and advantages of the invention will appear more clearly from the following specification in connection with the accompanying drawings, in which:

FIG. 2 is a side view of the trickling system shown in FIG. 1.

FIG. 3 represents a modification of the invention.

FIG. 4 shows a hook for suspending the lattice work, FIG. 4 being on a considerably larger scale than that of FIGS. 1 to 3.

Figure 1:
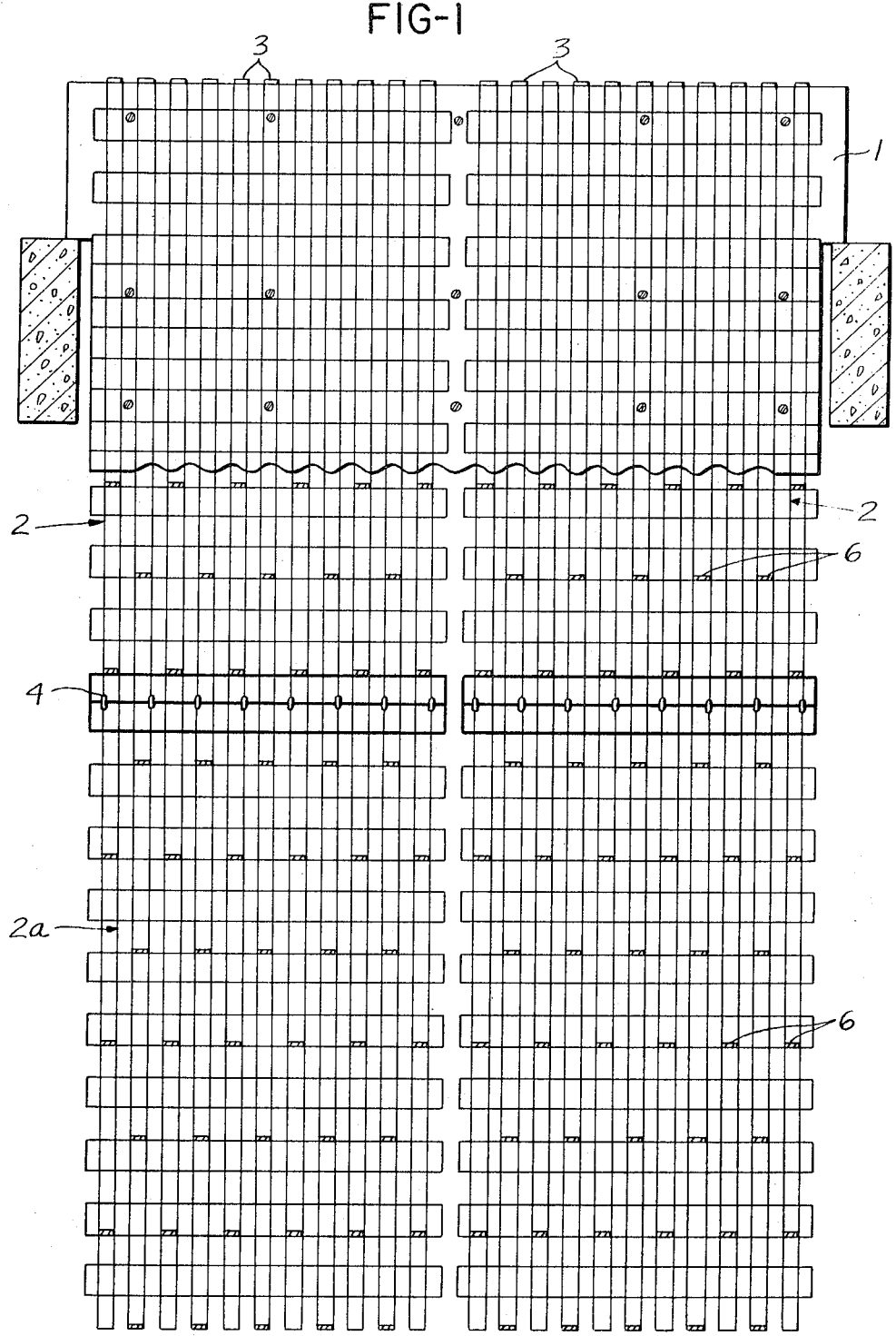
FIG. 1 is a partial cutout of the trickling system of a cooling tower.

The present invention is characterized primarily in that the support for the spray plates is in a manner known per se effected by lattice structures, so-called grids, which are arranged in the space below the trickling plates and in spaced relationship to each other and are connected to the trickling plates.

The connection of the lattice structures to the trickling plates is, in conformity with the present invention, effected by hooks which on one hand are suspended in openings provided for such suspension in the vicinity of the lower ends of certain trickling plates and on the other hand are placed about the uppermost horizontal struts of the lattice structures. It has been found expedient to reinforce the trickling plates which are intended for the suspension of the lattice structures and are provided with openings. Preferably, these trickling plates are designed thicker than the remaining trickling plates and are arranged in suitable spaced relationship therebetween.

The invention furthermore provides that the trickling plates and the lattice work are so arranged that their vertical planes extend at a right angle with regard to each other.

According to a further embodiment of the invention, the lattice work is passed through the intermediate spaces between two adjacent trickling plates in upward direction and is above the trickling plates connected by means of bars which extend through the mesh openings of the lattice work and rest on the trickling plates.

According to the present invention it is furthermore provided that at those ends of the lattice structures which extend into the space below the plate insert, further lattice structures are connected by means of sleevelike connecting members. According to a further feature of the invention, spacer means are provided in the space below the space insert. These spacer means consist of slats and are provided with slots which are slipped onto the horizontal of the lattice structure.

Referring now to the drawings in detail, it will be noticed therefrom that in the upper section of the cooling tower there is provided a plate insert or plate system which comprises a plurality of parallel large surface plates 1 which are arranged in spaced relationship to each other. According to the embodiment shown in FIGS. 1 and 2, the lattice structures 2 are arranged in the space between two adjacent trickling plates in predetermined spaced relationship to each other. The lattice structures 2 extend into the space below the plate insert. The connection of the lattice structures is effected above the trickling plates by means of short rods 3 which extend through the upper mesh openings of the individual lattice structures and rest on the plates 1. Mounted on the lattice structures 2 are by means of sleevelike connecting members 4 further lattice structures 2a. By means of spacer members 5, the lattice structures are prevented from displacing themselves relative to each other. The spacer member 5 consists of slats which are provided with slots in conformity with the mesh size of the lattice structures so that the slats can be slipped onto the horizontally extending struts of the lattice structures. The spray plates 6 are pushed through the mesh openings of the lattice structures and rest upon the horizontal struts. The lattice structures arranged between the trickling plates may within that section in which they extend between the trickling plates have a larger mesh width than in the section therebelow.

In conformity with the embodiments illustrated in FIGS. 3 and 4, the lattice structures 2 are, in contrast to the above described arrangement, provided merely in the space below the plates but not between the plates. The connection of the lattice structures 2 to the trickling plates 1 is effected by connecting means which are bent over at both ends to form a hook. A plurality of hooks 9 of the type shown in FIG. 3 on a larger scale than in FIGS. 1 and 2 are on one hand suspended at certain distance of the trickling plates and on the other hand are placed around the uppermost horizontal struts 10 of the lattice structure 2 so that the latter will practically be suspended on the plates. Advantageously, the plates intended for the suspension of the lattice structures are thicker than the remaining plates and are provided with openings 8 into which the upper ends of the hooks are suspended.

According to the present invention, the structural planes of the lattice structures are preferably at a right angle with regard to the lattice work of the plates. The ends of the hooks 9 are, as will be evident from FIG. 4, likewise bent at a right angle with regard to each other. The spray plates 6 rests upon the horizontal struts.

As will be evident from the above, the present invention makes it possible to mount the spray slats in a simple manner below the level of the trickling plates without the necessity of employing additional elements for connecting the lattice means.

It is, of course, to be understood that the present invention is, by no means, limited to the specific showing in the drawings but also comprises any modifications within the scope of the appended claims.

What we claim is:

1. A trickling assembly for cooling towers, which includes: a plurality of trickling plates arranged substantially parallel and in horizontally spaced relationship to each other, lattice means supported by some of said trickling plates and having at least a portion thereof arranged at a level lower than said trickling plates, spray slats arranged at a level below said trickling plates, said spray slats extending substantially horizontally and being supported by said lattice means in vertically spaced relationship to each other, a portion of said lattice means respectively extending between adjacent trickling plates to the upper ends thereof, and rod means extending through meshes at the upper ends of said lattice means and resting on the respective adjacent upper ends of said trickling plates.

2. An assembling according to claim 1, in which those trickling plates on which said lattice means are suspended are stronger than the remaining trickling plates.

3. An assembly according to claim 1, in which the planes defined by said spray slats are substantially at a right angle with regard to the planes defined by said lattice means.

4. An assembly according to claim 1, which includes additional lattice means arranged below said first-mentioned lattice means, and sleeve means connecting said last mentioned lattice means to said first-mentioned lattice means.

5. An assembly according to claim 1, in which said lattice means comprises vertically spaced horizontal strut means arranged at that portion of said lattice means which is at a level lower than said trickling plates, and which include substantially horizontally extending spacer means respectively resting on said vertically spaced horizontal strut means.

6. An assembly according to claim 5, in which those areas of said spacer means which rest on said strut means are notched.

* * * * *